(12) United States Patent  
Tombroff et al.

(10) Patent No.: US 8,682,976 B2  
(45) Date of Patent: Mar. 25, 2014

(54) FAULT-TOLERANCE MECHANISM OPTIMIZED FOR PEER-TO-PEER NETWORK

(75) Inventors: Dimitri Tombroff, Nozay (FR); Jean-François Rey, Brest (FR)

(73) Assignee: Alcatel Lucent, Paris (FR)

( * ) Notice: Subject to any disclaimer, the term of this patent is extended or adjusted under 35 U.S.C. 154(b) by 662 days.

(21) Appl. No.: 12/591,470

(22) Filed: Nov. 20, 2009

(65) Prior Publication Data

US 2010/0131611 A1 May 27, 2010

(30) Foreign Application Priority Data

Nov. 27, 2008 (FR) .................... 08 58060

(51) Int. Cl.  
*G06F 15/16* (2006.01)

(52) U.S. Cl.  
USPC ........... 709/205; 709/214; 709/226; 709/251; 370/222

(58) Field of Classification Search  
None  
See application file for complete search history.

(56) References Cited

U.S. PATENT DOCUMENTS

| | | | |
|---|---|---|---|
| 6,212,206 B1 * | 4/2001 | Ketcham | 370/516 |
| 2008/0120359 A1 * | 5/2008 | Murakami | 709/201 |
| 2008/0310302 A1 * | 12/2008 | Detwiler et al. | 370/230 |

OTHER PUBLICATIONS

Tim Wauters et al., "Distributed replica placement algorithms for peer-to-peer content distribution networks;" Proceedings of the 29th Euromicro Conference, Piscataway, NJ. Sep. 1-6, 2003, pp. 181-189.  
Zangrilli D Bryan, Sipeerior Technologies, "A Chord-based DHT for Resource Lookup in P2PSIP; draft-zangrilli-p2psip-dsip-dhtchord-00.txt." IETF Standard-Working-Draft, Internet Engineering Task Force, Feb. 25, 2007.  
Song Yongchao, "Re: [P2PSIP] replication for p2psip" Peer-to-Peer SIP working group discussion list <P2PSIP.IETF.org>, [Online], Dec. 5, 2007.  
Haifeng Yu et al, "Availability of multi-object operations" 3$^{rd}$ Symposium on Networked Systems Design and Implementation Usenix Association; Berkeley, CA, 2006, pp. 211-224.  
Ian Stoica et al. "Chord: A Scalable Peer-to-peer Lookup Service for Internet Applications;" San Diego, CA; Aug. 2001; pp. 149-160.

* cited by examiner

*Primary Examiner* — Mohamed Ibrahim  
(74) *Attorney, Agent, or Firm* — Harness, Dickey & Pierce

(57) ABSTRACT

A peer-to-peer network including a set of nodes distributed among a set of processing devices and arranged in a circular form in such a way that each node has a unique successor node. Each node has a memory to store data associated with keys and, on reception of a request containing a key, provides data associated with the key. Each data item stored in the memory of a first node is duplicated in the memory of a second node, different from said first node. The second node is chosen from among the nodes deployed on the set of processing devices different from the processing device on which the first node is deployed.

12 Claims, 2 Drawing Sheets

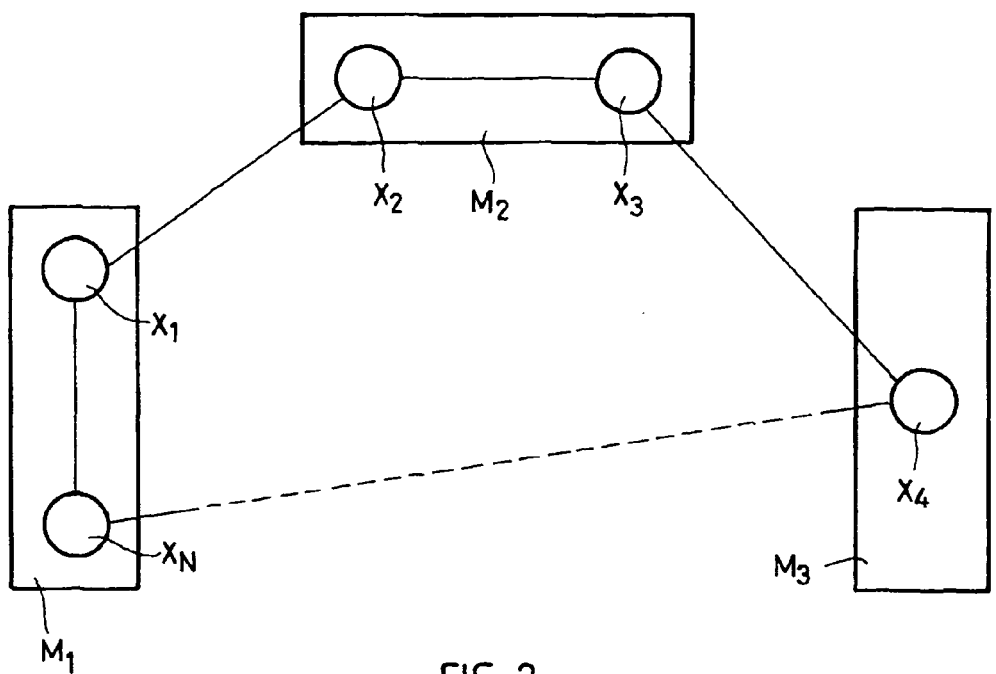
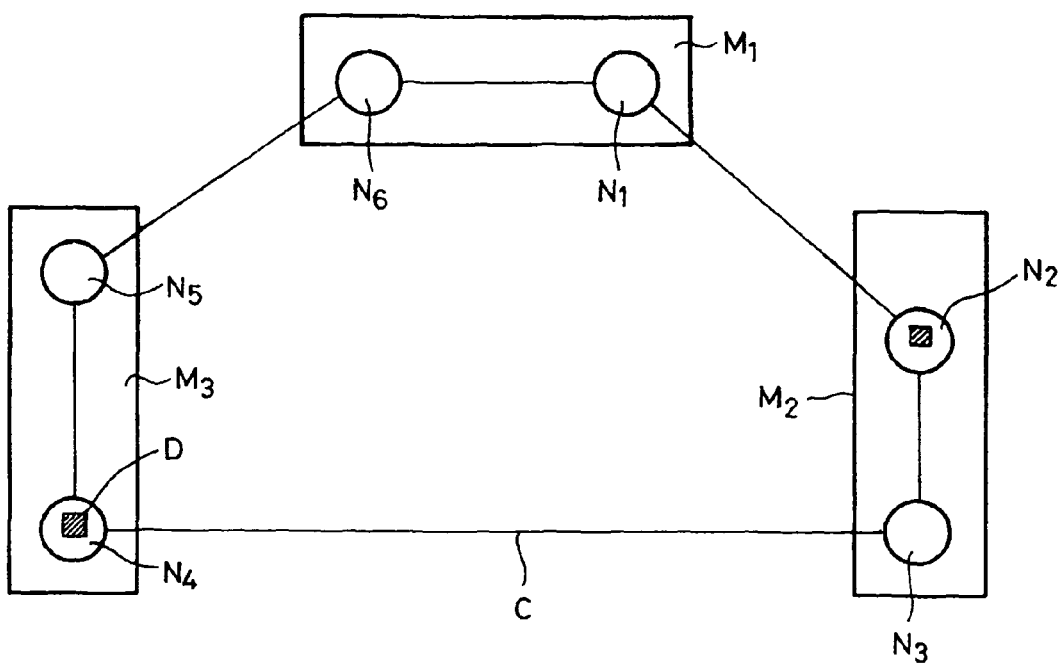

FIG_3
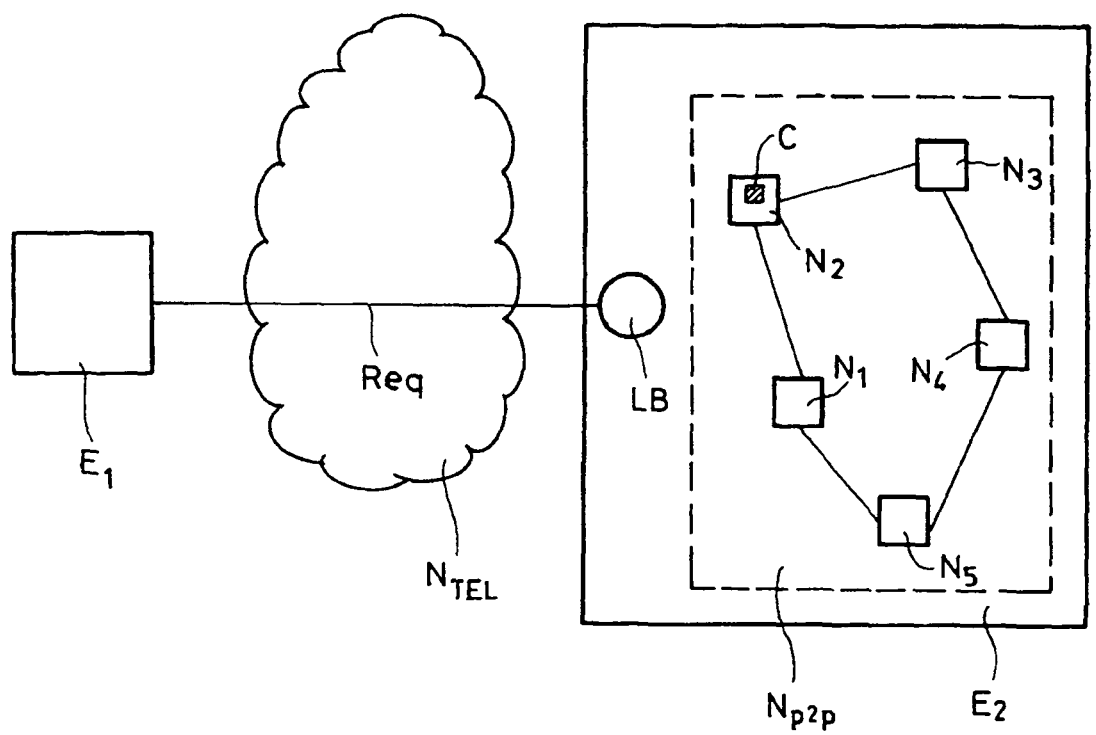

FAULT-TOLERANCE MECHANISM OPTIMIZED FOR PEER-TO-PEER NETWORK

PRIORITY STATEMENT

This application claims priority under 35 U.S.C. §119 upon French Patent Application No. 0858060, filed on Nov. 27, 2008 in the French Patent Office, the entire contents of which are incorporated by reference herein.

BACKGROUND OF THE INVENTION

The present invention relates to the deployment of a peer-to-peer network on a set of processing devices. It concerns more specifically the use of these peer-to-peer networks for telecommunication applications.

It is known to distribute certain telecommunication applications, in particular on a set of processing nodes. In this way, each node only processes a part of the requests addressed to the application and it is possible to dimension, dynamically if necessary, the number of nodes based on the resources required to process these requests. Such an architecture also means the application can easily be made fault-tolerant through the inherent redundancy between the nodes.

SUMMARY OF THE INVENTION

For certain applications, however, the problem still exists of the location of contextual information within this set of nodes. Certain applications such as a signaling element may require the storage of a context between two messages which it is sent. This context may be used to process a following message appropriately. This is the case for a SIP or "proxy SIP" signaling element which must process a request based on the status of the SIP session (SIP standing for "Session Initiation Protocol").

For this type of application, it is also necessary firstly to store this contextual information and secondly to be able to locate said information at the appropriate moment.

One possible approach involves having a centralized database to which each of the nodes has access and can store and retrieve contextual information for the sessions it manages.

However, when this centralized database is implemented on a hard disk or an equivalent hardware support, the information access time becomes restrictive and makes this solution unsuitable for applications requiring very short response times such as telecommunication applications.

Implementing the database in the memory removes this access time problem, but the need to incorporate redundancy to distribute the load of the accesses and to meet the fault-tolerance constraints makes the system complex. It in fact involves constituting a network of bases separate from the set of processing nodes. Aside from the fact that such an approach does not seem very satisfactory on an intellectual level, it also causes configuration problems and is neither flexible nor easy to manage.

Peer-to-peer networks, through the use of a distributed hash table, are used to resolve these problems in an automatic and transparent manner for the developer of the application and for the devices external to the application and which have to communicate with said application.

FIG. 1 shows in diagram form a peer-to-peer network comprising N nodes X1, X2, X3, X4 ... XN.

The contextual information to be stored is associated with keys which are distributed over this set of nodes. In general, this distribution is carried out by a hashing function which is used to project the space of the keys to the space of the nodes while obtaining a good load distribution among these nodes.

The contextual information can be found from the key. The application of the same hashing function is used to determine the node associated with this key, then to retrieve the information stored on this node and associated with the key.

In order to make the system fault-tolerant, it is generally intended for each association between a key and contextual information to be replicated on a second node. In this way, if the first node no longer works, the contextual information can be retrieved from this second node.

A simple algorithm commonly used to determine which node must store the copy of the contextual information involves selecting the successor, in other words the node following the order of the peer-to-peer network. The advantage of such a choice is that in the event of a failure of a node, the copy of the contextual information is immediately located. This thereby avoids a period of uncertainty following a failure, requiring an additional procedure to correctly manage this period without risking an incorrect response to a request.

Therefore, if the hash function applied to the required key designates the node X2 and this node is no longer accessible or no longer contains the information following a malfunction, the system automatically determines that a copy of the required contextual information is located in the node X3.

These implementations of a peer-to-peer network are explained in further detail in the article "*Chord: A Scalable Peer-to-peer Lookup Service for Internet Applications*" by Ian Stoica, Robert Morris, David Karger, M. Frans Kaashoek and Hari Balakrishnan, ACM SIGCOMM 2001, San Diego, Calif., August 2001, pp. 149-160.

There are articles which describe methods for improving fault-tolerance in a "Chord" network. For example, the article "*Availability of multi-object operations*" by Haifeng Yu, Philip B. Gibbons and Suman Nath suggests examining how data is duplicated in such a network.

However, in practice, the technical problem of fault-tolerance persists. Peer-to-peer networks are in practice deployed on processing device networks. Since these devices are increasingly powerful, it is advantageous to deploy several nodes on the same device; other than having a number of processing devices less than the number of nodes.

In the example of FIG. 1, the nodes X2 and X3 are located on device M2, nodes X1 and XN are located on device M1 and node X4 is located on device M3.

As a result, if a processing device suffers a malfunction, the nodes present may be affected and no longer work. Therefore, if the processing device M2 breaks down, the two nodes X2 and X3 no longer work.

Yet according to the traditional algorithm involving locating the copy of the information on the successor node, the information stored on node X2 is duplicated on node X3. As a result, despite the fault-tolerance mechanism of the state of the art, the contextual information associated with the node is no longer available.

The state of the art is therefore unsuitable for providing sufficient fault-tolerance. The aim of the present invention is to overcome this insufficiency by improving the management of a peer-to-peer network.

To do so, the object of the invention is a peer-to-peer network consisting of a set of nodes distributed among a set of processing devices and arranged in a circular form in such a way that each node has a unique successor node, each node having a memory to store data associated with keys and, on reception of a request containing a key, providing data associated with said key, and each data item stored in the memory of a first node being duplicated in the memory of a second node, different from said first node.

This peer-to-peer network is characterized in that the second node is chosen from among the nodes deployed on the set of processing devices different from the processing device on which said first node is deployed.

According to the invention's embodiments, the second node may be the first node in said circular form, which is deployed on processing devices different from that of said first node.

At least one node may possess synchronization information which, after the output of the node preceding it in said circular form has been detected, takes a first value, and after a phase of resynchronizing the data contained within said node preceding it, takes a second value, and wherein said node is designed to reply to a request containing a key as a function of the presence of data associated with that key in its memory and on said synchronization information.

Said data may further be duplicated in the memory of more than one node of said network.

The invention will appear more clearly in the following description, with reference to the attached figures.

BRIEF DESCRIPTION OF THE DRAWINGS

FIG. 1, previously commented upon, shows in diagram form a peer-to-peer network, compliant with the state of the art.

FIG. 2 shows in diagram form a peer-to-peer network deployed on a set of processing devices, in accordance with the invention.

FIG. 3 illustrates a communication element according to the invention.

FIG. 2 shows a peer-to-peer network deployed on a network consisting of 3 processing devices M1, M2, M3. It is made up of a set of nodes N1, N2, N3, N4, N5, N6, arranged in a circular form C. Each node thereby has a single successor node and a single predecessor node.

DETAILED DESCRIPTION OF THE EMBODIMENTS

Each node has a memory for storing data associated with keys.

In general, a hash function is associated with the entire peer-to-peer network, and makes it possible to determine a key based on a data item. The keys, for their part, make it possible to determine a node of the network.

In this way, to store a new value in such a peer-to-peer network, the hash function should be applied to that value in order to determine an associated key, and then a storage request should be sent to the node determined by that key.

In order to locate saved data, the key also directly determines the node which contains it.

Different implementations of these mechanisms exist, and are thoroughly described in the state of the art. For example, the article on Chord mentioned above indicates a common implementation of these mechanisms.

Each data item, furthermore, is replicated, i.e. recopied in the memory of a node different from the node determined by the hash function. According to the invention, this second node is chosen from among the nodes deployed on the set of processing devices different from the processing device on which the first node is deployed.

Preferentially, the second node is the immediately-following node in the circular form C which is deployed on a processing device different from that of the first node.

In the example in FIG. 2, applying the hash function to the data D has made it possible to determine the node N2 in order to save it. This node N2 is deployed on a processing device M2.

The circular form C is arranged in such a way that the successor of the node N2 is node N3. However, this node N3 is deployed on the same processing device M2 as the node N2 and is therefore not suitable.

The node immediately following that node N2 which is deployed on a different processing device is node N4. In this preferential implementation of the invention, node N4 is the one which is therefore chosen to store the duplicated data D in its memory.

If the processing device M2 were to become non-operational, nodes N2 and N3 also do, and the peer-to-peer network rearranges itself among the remaining nodes N1, N4, N5, N6. This rearrangement phase is well-known to the person skilled in the art and is described in the literature, particularly in the articles mentioned above.

As the data D has been replicated to the node N4, they remain present within the peer-to-peer network.

The same holds true when only node N2 becomes non-operational. Although node N3 remains operational and therefore a member of the peer-to-peer network, the data D is duplicated according to the same rule in node N4's memory.

In this manner, a single rule is uniformly applied, and in order to locate a data item D saved in the peer-to-peer network, conventional mechanisms should first be used to locate the node associated with the sought-after data, and then the immediately following node which is deployed on a different processing device should be determined.

Whenever a node exits from the peer-to-peer network, such as after a malfunction, the network rearranges itself. This rearrangement phase may cause the redistribution of the saved data, and particularly the replication of data formerly contained within the memory of the node N2 based on the duplicated data. Until the data has been completely rearranged, the peer-to-peer network is undergoing a resynchronization phase.

The invention's mechanism poses an additional problem in managing this synchronization phase.

This is because during this synchronization phase, the node(s) located between the one which exited from the peer-to-peer network and the node immediately following it deployed on a different processing device do not have any clear knowledge of their location.

In the example in FIG. 2, after the exit of node N2, the requests containing the key associated with the data D lead to node N3 through application of the hash function.

This node N3 does not have the data D in its memory.

However, it is important that it does not reply to the request by a message reporting that the data D does not exist.

The invention therefore features a mechanism for guarding against a hasty and incorrect response from a queried node.

It should be noted that a simple mechanism would consist of always transmitting the request to the immediately following node. However, such a mechanism would be extremely costly, because it would involve an additional transmission for each request for which the node does not have the corresponding data. In other words, this involves a message being needlessly transmitted every time a data item is not present within the peer-to-peer network.

This mechanism is therefore not acceptable.

According to one implementation of the invention, the node N3 possesses synchronization information that may take two values.

Whenever the node N3 detects the output of the node N2 preceding it within the peer-to-peer network, the synchronization information takes a first value.

Following a phase of re-synchronizing the data contained within the node, the synchronization information takes a second value. This phase of data resynchronization takes place during the network's rearrangement phase, which is triggered when a node exits.

After the rearrangement phase, the node's N3 data synchronizes with the data contained within the following node. Thus, the data D is recopied from node N4 to the node N3. The node N4 saves the data D as a redundant copy.

The node's N3 reply to a request containing a key depends both on the presence of that data in that node's memory and on the synchronization information's value.

If the node requested is within the node's memory, that node replies to the request by supplying the data.

Otherwise, if the synchronization information has the first value, the request is transmitted to the following node; and if the synchronization information possesses the second value, the node N3 replies with a message indicating that the sought-after node is not contained within the peer-to-peer network.

According to one variant, whenever the synchronization information possesses the first value, the node N3 awaits the end of the synchronization phase. At that time, it responds depending on whether or not the requested data is present in its memory.

Another variant may consist of replying to the request with a message indicating that it may not yet reply, and asking the request's sender to repeat his or her request.

FIG. 3 shows the application of a peer-to-peer network according to the invention with a communication element. This may be an application server in a communication architecture, such as an IMS ("IP Multimedia Subsystem") architecture. It may also be a signaling element, such as a proxy compliant with the SIP protocol ("Session Invitation Protocol") as specified by RFC 3261 of the IETF, or a CSCF function ("Call Session Control Function") within an IMS architecture.

This communication element $E_2$ has means of receiving a request Req coming from another element $E_1$ through a communication network $N_{TEL}$. The request Req is processed by a load distribution module LB, intended to determine, for each first request of a communication session, which node N1, N2, N3, N4, N5 must process the request. These nodes form a peer-to-peer network $N_{p2p}$ as described previously.

The processing of the request may cause the generation of contextual information which may be useful or necessary for the processing of another request belonging to the same session. It is therefore associated with a key, and stored on the node corresponding to this key.

The association is made by a hash function applied to a session identifier (for example, IP addresses of the issuing communication element $E_1$, "call ID" header of the SIP request, etc.). The result of this hashing function may directly give the number of the node modulo the number of nodes in the network. These different mechanisms are known to the state of the art and are not described in detail in this patent request. The article mentioned previously and concerning the "Chord" mechanism may be consulted to obtain some of these details.

In the example of FIG. 3, the contextual information C is stored in the node $N_2$. It is duplicated within the immediately following node and is not deployed on the same processing device. It is assumed that this is node $N_4$.

In this way, the next requests belonging to the same session may be processed by recovering the textual information present on the node $N_2$, and in the event of a failure of this node, on the successor, node $N_4$.

Since the two nodes $N_2$ and $N_4$ are not on the same processing device, the probability of them failing simultaneously is very low.

The invention therefore resolves the technical problem, without fundamentally changing the known mechanisms of the peer-to-peer network management.

The invention claimed is:

1. A peer-to-peer network comprising:
   a set of nodes distributed among a set of processing devices and arranged in a circular form in such a way that each node has a unique successor node, each node having a memory to store data files, wherein the data files are associated with keys and, on reception of a request containing a key, providing data files associated with said key, and each data file stored in the memory of a first node being duplicated in the memory of a second node, different from said first node, wherein said second node is chosen from among the nodes deployed on all of the processing devices different from the processing device on which said first node is deployed.

2. A peer-to-peer network according to claim 1, wherein the number of said processing devices is less than number of said nodes.

3. A peer-to-peer network according to claim 1, wherein said second node is the first node within said circular form, which is deployed on a processing device different from that of the first processing node.

4. A peer-to-peer network according to claim 1, wherein at least one node possesses synchronization information which, after the output of the node preceding it in said circular form has been detected, takes a first value, and after a phase of resynchronizing the data files contained within said node preceding it, takes a second value, and wherein said node is designed to reply to a request containing a key as a function of the presence of data files associated with that key in its memory and on said synchronization information.

5. A peer-to-peer network according claim 1, wherein said each data file is duplicated in the memory of more than one node of said network.

6. A communication element, containing a peer-to-peer network according to claim 1.

7. A method of optimizing fault tolerance in a peer-to-peer network, the peer-to-peer network having a plurality of processing devices, each of the processing devices having at least one node associated with the peer-to-peer network, the nodes being arranged in a circular form, such that each node has a unique successor node, and each of the plurality of processing devices being associated with a memory, the method comprising:
   storing a data file in the memory of a first node,
   storing a key in the first node, the key associated with the data file, and
   duplicating the data file in a second node, the second node being chosen from among the nodes deployed on all of the processing devices different from the processing device on which said first node is deployed.

8. A method according to claim 7, wherein the number of said processing devices is less than number of said nodes.

9. A method according to claim 7, wherein said second node is the first node within said circular form, which is deployed on a processing device different from that of the first processing node.

10. A method according to claim 7, further comprising: duplicating the data file in the memory of more than one node of said network.

11. A peer-to-peer network comprising:
a plurality of processing devices, each of the processing devices having at least one node associated with the peer-to-peer network, the nodes being arranged in a circular form, such that each node has a unique successor node,
a plurality of memories, each of the plurality of memories being associated with one of the plurality of processing devices and each of the memories being configured to store data files, wherein the data files are associated with keys,
  each of the nodes being further configured to provide data files associated with said keys upon reception of a request containing a key, and each data file stored in the memory of a first node being duplicated in the memory of a second node, different from said first node, wherein said second node is chosen from among the nodes deployed on all of the processing devices different from the processing device on which said first node is deployed.

12. A peer-to-peer network comprising:
a set of nodes distributed among a set of processing devices and arranged in a circular form in such a way that each node has a unique successor node, each node having a memory to store data files, wherein
the data files are associated with keys and, on reception of a request containing a key, providing data files associated with said key, and each data file stored in the memory of a first node being duplicated in the memory of a second node, different from said first node,
said second node is chosen from among the nodes deployed on all of the processing devices different from the processing device on which said first node is deployed,
at least one node possesses synchronization information which, after the output of the node preceding it in said circular form has been detected, takes a first value, and after a phase of resynchronizing the data files contained within said node preceding it, takes a second value, and
said node is designed to reply to a request containing a key as a function of the presence of data files associated with that key in its memory and on said synchronization information.

* * * * *